United States Patent

Vimercati

[11] 4,190,231
[45] Feb. 26, 1980

[54] BILATERALLY BALANCED FLUID CONTROL VALVE

[76] Inventor: Ettore Vimercati, 42 Via F. Carridoni, Bergamo, Italy

[21] Appl. No.: 824,229

[22] Filed: Aug. 12, 1977

Related U.S. Application Data

[63] Continuation-in-part of Ser. No. 811,858, Jun. 30, 1977, abandoned, which is a continuation-in-part of Ser. No. 566,071, Apr. 8, 1975, abandoned.

[30] Foreign Application Priority Data

May 21, 1974 [IT] Italy .............................. 22998 A/74

[51] Int. Cl.$^2$ ............................................. F16K 47/00
[52] U.S. Cl. .................................. 251/118; 251/100; 251/205; 251/282; 251/DIG. 1; 251/340; 251/344; 251/353
[58] Field of Search ............... 251/100, 205, 282, 319, 251/DIG. 1, 118, 123, 340, 343, 344, 353; 138/42, 43

[56] References Cited

U.S. PATENT DOCUMENTS

| | | | |
|---|---|---|---|
| 2,092,819 | 9/1937 | Tennant | 251/282 |
| 2,210,480 | 8/1940 | Brice | 138/42 |
| 2,732,172 | 1/1956 | Curran | 251/282 |
| 3,030,945 | 4/1962 | Clark | 251/319 |
| 3,071,156 | 1/1963 | Porland et al. | 251/282 |
| 3,258,030 | 6/1966 | Clark, Jr. | 251/100 |
| 3,680,832 | 8/1972 | Ulizky | 251/282 |

FOREIGN PATENT DOCUMENTS

| | | | |
|---|---|---|---|
| 855649 | 9/1952 | Fed. Rep. of Germany | 251/319 |
| 2,517,787 | 12/1975 | Fed. Rep. of Germany | 251/DIG. 1 |
| 1257145 | 2/1961 | France | 251/282 |

Primary Examiner—William R. Cline
Assistant Examiner—H. Jay Spiegel
Attorney, Agent, or Firm—Stevens, Davis, Miller & Mosher

[57] ABSTRACT

A valve for controlling fluid flow is disclosed in which a fluid outlet is controlled by two separate components, one being tubular in shape and located inside the other hollow component. Both the hollow and the tubular components may either be the valve body and closing element respectively, or vice-versa. The two components are reciprocally slidable through elastic sealing rings along their common longitudinal axis, and are also rotatable about that same axis, whence the path of fluid flow may be readily controlled in a gradual manner from the fully shut position to the fully open position, depending upon the longitudinal position of a plunger element with respect to the valve body. The plunger is in a state of static balance with respect to any existing pressure or friction, as well as with respect to its own weight.

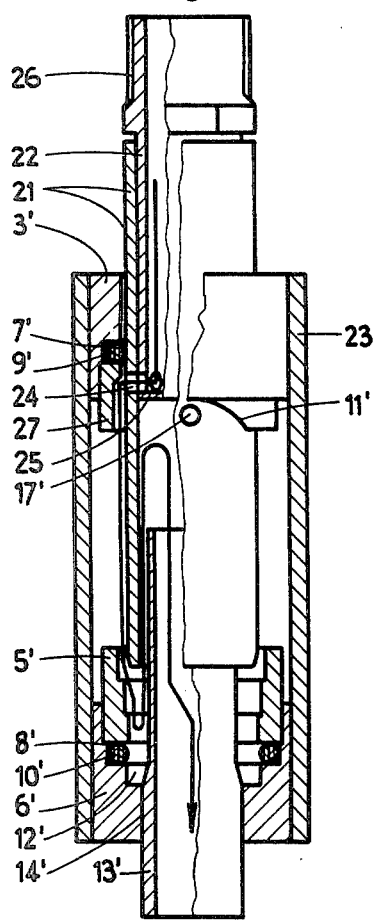
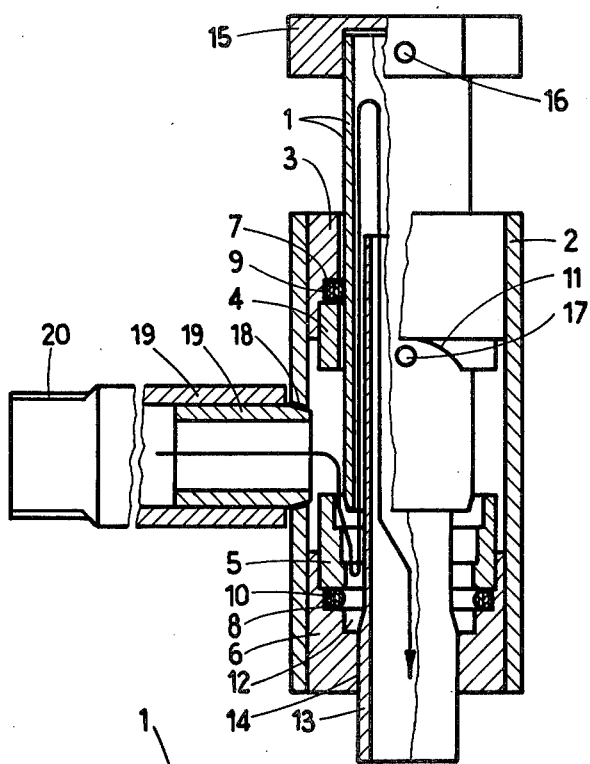
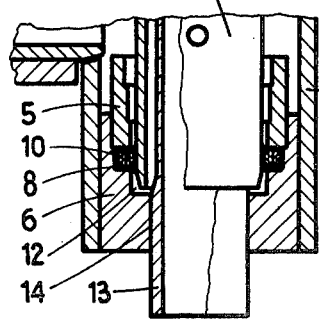

BILATERALLY BALANCED FLUID CONTROL VALVE

This is a continuation-in-part of my prior application Ser. No. 811,858, filed June 30, 1977, which in turn is a continuation-in-part of my prior application Ser. No. 566,071, filed Apr. 8, 1975 both now abandoned.

It is well known that in a draw-off valve of conventional design, the control components must withstand the whole fluid pressure to which, as the valve is shut, there is added the reaction of the elastic distortion of the gasket, the latter being invariably greater than necessary through excessive torque being applied as the valve is over-tightened. This requires the application of an appropriate compensating structure to the stationary component, and also requires the said structure to be screwed or otherwise coupled to the moving components of the valve to overcome such stresses as come into play, which stresses, moreover, bring about the well-known service wear between the reciprocally-contacting reciprocally-sliding surfaces, as well as the gradual loss of gasket resiliency which ultimately gives rise to fluid leakage.

In the valve to which the present invention relates, the control component is in a state of static balance relative to the pressure and other forces involved, irrespective of the particular control position of the valve, including its "shut" position. As closure of the valve is effected on two oppositely-positioned holes, a bilateral shutting action is obtained, and since both holes have identical cross-sectional areas, a balanced shutting action is likewise obtained with this valve. As closure is effected on two oppositely-positioned elastic sealing rings which are solely subjected to the fluid pressure, moreover, gasket distortion such as would be caused by excessive force being applied is avoided.

The design and arrangement of the valve according to the present invention dispenses with any fixed-component structure, as well as with the need to provide coupling means between the moving component and any such structure. As service wear is thereby eliminated, superior properties are imparted to the valve, such as an absolute sealing action and an unlimited service life.

Consequently, one of the principal objects of this invention is to provide a novel valve in which the fluid outflow is shut off or admitted through the longitudinal positioning, referred to the valve body, of a plunger, which may be displaced from its position of rest to any other desired pre-set position, under guided conditions and solely under the direct control of the operator.

A further object of this invention is to provide a valve generally as above described, in which the plunger is in a state of static balance with respect to any existing pressure or friction and with respect to its own weight, irrespective of its position within the predetermined limits of its travel.

A further object of the invention is to provide a novel valve in which a smooth turbulence-free flow of fluid is maintained at all rates of flow all the way to fully open position, with no need for any ancillary equipment whatever for the purpose.

A further object of this invention is to provide a valve generally as described above, in which the aforesaid specific fluid flow-rate improvements are insured by the presence of five parts to which such improvements relate, i.e., (a) the top sleeve's cylindrical surface acting as a guide for the plunger; (b) the portion of the bottom sleeve's cylindrical surface above the sealing ring, whose vertical cross section is of appropriate shape for it to act as a fluid flow control; (c) a cavity, being a part of the hollow component, located beneath the bottom sealing ring and acting as a chamber in which the fluid kinetic energy is dissipated, concomitantly with the fluid discharge or spout; (d) a tubular discharge or spout, acting also as a fluid outflow control; and (e) the smooth cylindrical surface opposite the sealing rings and rubbing or pressing lightly against them, to insure the correct operation of the plunger.

Still another object of the invention is to provide a novel unconventional valve in which the five parts above are found in four basic embodiments. The first embodiment is the hollow component constituting the valve body and carrying the sealing rings, and the tubular plunger component; the second embodiment is the tubular component constituting the valve body, and the hollow plunger component carrying the sealing rings; the third embodiment is the hollow component constituting the valve body, and the tubular plunger component carrying the sealing rings; and the fourth embodiment is the tubular component constituting the valve body and carrying the sealing rings, and the tubular plunger component.

It is however another object of this invention to provide a novel and convenient valve having the foregoing features which will prove reliable and endowed with a long service life, owing to the fact that its sealing rings are subject to very little or no wear, and to none of the damaging effects originating from improper operation. The valve being of simple construction, it can be readily fabricated from tubular or round sections using an automatic lathe, or from granulated plastics using an appropriate molding machine; and allowing for a wide selection of materials, ranging from deluxe materials such as stainless steel, to low-cost materials such as synthetic plastics.

The structure and operating features of the novel valve according to the present invention will now be described for the four embodiments mentioned above, with particular reference to the accompanying drawings in which the bottom sleeve's profile adopted for controlling the fluid flow is a three-step shape, which particular configuration has proved highly satisfactory in the tests performed, without however detracting from the acceptability of the profile of an inverted frustum of cone with a very slight taper.

FIG. 1 is the cross-section of a valve, shown in the open position, in which the hollow component is the valve body and the tubular component is the shutter or plunger, and in which the sleeves carrying the sealing rings are permanently fitted inside the hollow component.

FIG. 2 is the bottom portion of the cross-section of the valve of FIG. 1, shown in the closed position.

FIG. 3 is the cross-section of a valve, shown in the open position, in which the hollow component is the shutter or plunger, and the tubular component is the valve body in which the sleeves carrying the sealing rings are permanently fitted inside the hollow component.

Figure 5:
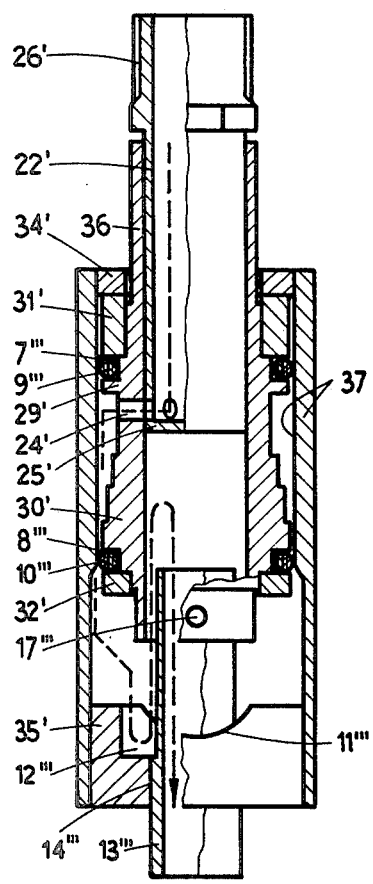
FIG. 5 is the cross-section of a valve, shown in the closed position, the embodiment being the same as in FIG. 3, in which, however, the sleeves carrying the sealing rings are permanently fitted on the outside of the tubular component.

The valve of FIG. 1, shown in the open position, consists of a movable tubular component 1, acting as the shutter or plunger, with a smooth outside surface, same number, and a stationary hollow component 2, being the valve body, inside which two sleeves are fitted in a mutually co-axial position, each sleeve in turn consisting of two parts for manufacturing reasons; parts 3 and 4 forming the top sleeve, incorporating a recess 7 and a sealing ring 9, while parts 5 and 6 form the bottom sleeve, incorporating a recess 8 and a sealing ring 10. The inside wall of part 3 facing the smooth cylindrical surface of the shutter or plunger acts as a guide for the plunger, whereas part 4 incorporates at its bottom end two oppositely-positioned recesses 11 which are involved in the operation of the valve. The inside wall of part 5 acts as a fluid flow control means by means of three adjacent stepped portions whose diameters are only slightly different from that of the opposite smooth cylindrical surface; in particular, such a difference is the least for the bottom step, slightly larger for the intermediate step, and largest for the top step. By way of example, in a ½ inch valve, the above differences will be in the order of a few hundredths of a millimeter for the bottom step. Part 6 incorporates a cavity 12 and a discharge or spout means 13 fitted into a bore 14 of part 6 which is co-axial with the hollow component.

The shutter or plunger 1, fitted with a handle 15 carrying a signal dot 16, will rub or press lightly against the sealing rings, its reciprocating traverse being restricted at the bottom by part 6 and at the top by a cylindrical dowel 17, the latter being electrically welded to the smooth cylindrical surface of the shutter or plunger 1. In particular, the traverse of the plunger will be limited by the bottom lip of part 4 abutting against the said dowel 17 with the valve in a half-opened position or, upon the plunger being rotated over approximately 90 degrees, by the top of recess 11 abutting against the said dowel 17, as the valve is fully opened. With the said latter setting, the signal dot 16 will occupy the position shown in FIG. 1.

A bore 18 is located in the stationary hollow component 2 in the area between the two sealing rings, a pipe 19, in two parts for manufacturing reasons, being welded into the said bore 18. The end 20 of pipe 19 is threaded, and can thus be screwed into the fluid supply pipe. The direction of the fluid flow is shown by the arrow in FIG. 1.

The valve in FIG. 3, shown in the open position, consists of a stationary tubular component comprised of two parts 21 and 22, for manufacturing reasons, and constituting the valve body, part 21 featuring a smooth outside cylindrical surface, same number, and a moving hollow component 23, being the valve plunger, inside of which two mutually co-axial sleeves are fitted, each sleeve consisting of two parts for manufacturing reasons; in particular, the top sleeve is comprised of parts 3' and 27, and the bottom sleeve is comprised of parts 5' and 6'.

Part 21 incorporates intake ports 24, located slightly beneath the small strip or region of contact between the top sealing ring 9' and the facing smooth surface, when the valve is in the fully-open position shown in FIG. 3. Part 22 incorporates intake ports corresponding to intake ports 24, and a closed bottom end 25 located beneath the said intake ports whereas its opposite end 26 is threaded, and can thus be screwed into the fluid supply pipe. Part 27, though serving the same purpose as part 4 in FIG. 1, incorporates a recess in the wall facing the smooth outside cylindrical surface of part 21, so as to permit the fluid to be freely admitted. The movable hollow component 23 is smooth and has no outside recess, but is frontally equipped with a signal dot, not shown in the drawing, indicating the full-flow position.

All other details are identical with the corresponding details in FIG. 1, and are identified in FIG. 3 by the same numbers provided with an apostrophe. An arrow indicates the direction of the fluid flow.

Figure 4:
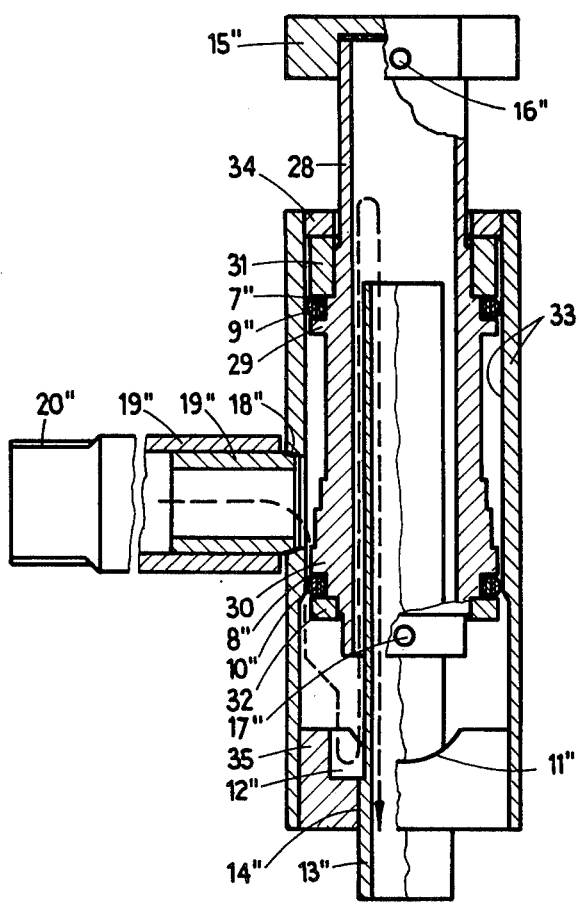
FIG. 4 is the cross section of a valve, shown in the closed position, the embodiment being the same as in FIG. 1, in which, however, the sleeves carrying the sealing rings are permanently fitted on the outside of the tubular component.

The valve of FIG. 4, shown in the shut position, consists of a moving inner tubular component 28 which is the valve plunger, carrying two outside sleeves, both of these being in two parts for manufacturing reasons, the top sleeve comprising a shoulder 29 and a ring 31, while the bottom sleeve comprises a shoulder 30 and a ring 32, and an outer hollow component 33 which is the valve body having a smooth inside cylindrical surface, same number.

In the embodiment of FIG. 4, as in the case of FIG. 5 below, the part of each sleeve to be permanently fitted onto the tubular component is conveniently machined as a shoulder directly from or on the tubular component itself, for greater manufacturing convenience, rather than fitting the said tubular component with two separately manufactured sleeves. Conceptually, these two construction methods are equivalent, although the former requires the employment of a pipe having an adequate wall thickness for the purpose.

The outside wall of part or ring 31 facing the smooth inside cylindrical surface of 33 acts as a guide for the plunger, whereas the bottom shoulder 30 located above the bottom sealing ring 10" acts as a fluid flow control owing to its three adjacent steps, whose diameters are only slightly different from the diameter of the opposite smooth inner cylindrical surface, such differences being similar to, but slightly smaller rather than larger, than those shown in FIG. 1.

The outer hollow component 33 is obstructed or closed at the top by a ring 34 and at the bottom by a sleeve 35, which incorporates a cavity 12" and a discharge or spout 13" force-fitted into the bore 14' of the sleeve 35, said sleeve incorporating two opposite recesses 11" machined into its top lip, and cooperating with the operation of the valve. The plunger 28, fitted with a handle 15" and a signal dot 16", rubs or presses lightly via its sealing rings 9" and 10" against the opposite smooth inside cylindrical surface of 33, the reciprocating traverse of the plunger being restricted at the top of the ring 34 and at the bottom by a cylindrical dowel 17", the latter being electrically welded to the outside surface of the body 28, the said dowel contacting the top lip of sleeve 35 when the valve is half-opened, or as the plunger is rotated over approximately 90 degrees, the bottom of recess 11" when the valve is fully opened. When the valve is fully opened, the signal dot 16" will occupy the position appearing in FIG. 4 of the drawings.

The bore 18" in the wall of 33 is located always within the area between the two small contact areas of the sealing rings in the extreme positions of the plunger. All other details of FIG. 4 are identical with the corresponding details shown in the valve of FIGS. 1 and 2, which represents a broadly similar embodiment, and are identified by the same number, provided with a double apostrophe. A dotted arrow indicates the direction of fluid flow as the valve is opened.

The valve of FIG. 5, shown in its shut position, consists of a stationary tubular component formed, for manufacturing reasons, of two parts, 36 and 22', forming the valve body, and a moving hollow component 37 forming the valve plunger having a smooth inside cylindrical surface, same number. All other details are identical either with the corresponding details in the valve of FIG. 3, the latter being a similar embodiment, or with those of the valve shown in FIG. 4, the latter being similar insofar as the sealing ring positions are concerned. Said details are identified in the drawing by the same number, provided with apostrophes. The dotted arrow indicates the flow direction as the valve is opened.

The mode of operation of all four valves shown in the above figures is identical. For each of them there are five typical elements which characterize the present invention. Thus, for FIGS. 1, 3, 4 and 5, respectively, such elements are (a) the cylindrical surface of the top plunger-guiding sleeve: 3, 3', 31 and 31', (b) the cylindrical surface of the bottom sleeve, with appropriate shape and size, to operate as a fluid flow control: 5, 5', 30 and 30', (c) the cavity which is a part of the hollow component: 12, 12', 12" and 12''', (d) the tubular-shaped discharge or spout: 13, 13', 13" and 13''', and (e) the smooth cylindrical friction or rubbing surface of the sealing rings: 1, 21, 33 and 37.

The mode of operation of the valve shown in FIGS. 1 and 2 will now be described, whereupon any person skilled in the art will easily understand the operation of the valves shown in the other figures.

Three forces are applied on the plunger, i.e., the weight of the plunger itself, the fluid pressure, and the friction of the sealing rings. One condition to be met is the choice of the right amount of effort required to be exercised by the operator in lifting and lowering the plunger. In this connection the fact should be stressed that when the valve is open only one sealing ring, namely the top one, is constantly engaged, the bottom ring being engaged only when the valve is shut. The appropriate predetermined effort on the part of the operator is obtained by selected the correct degree of roughness for the cylindrical rubbing or contact surface of the sealing rings.

Referring to FIG. 2 in which the valve is shown in its shut position, fluid under pressure is both inside the hollow component 2 and outside the tubular component 1, whereas the fluid not under pressure is inside cavity 12 and fills the space between the inside surface of the tubular component 1 and the outside surface of the spout 13, up to the top lip of the spout.

Referring again to FIG. 1, as the plunger 1 is lifted beyound the control or contact exerted by the bottom sealing ring 10, until its bottom lip faces the wall of the first step in part 5, an extremely small gap is opened for the fluid under pressure to flow through, and the pressure energy is converted into kinetic energy, which is dissipated as the fluid under pressure collides against the fluid resting inside cavity 12, causing the level of the fluid inside the tubular component 1 to rise smoothly above the spout's top lip. As the plunger motion begins, only a few drops are let through, then the flow increases to a very limited extent; the outflow rate is low, and the fluid emerges smoothly and free of turbulence. Under such conditions, the fluid surface rises above the spout brim, but not to the top, i.e., it does not reach the inside circular surface located beneath element 15, so that no upward force is exerted by pressure upon the plunger, whose weight is balanced by the friction of the top sealing ring.

As the plunger is further raised until its bottom brim faces the wall of the second step of part 5, i.e., until the bottom brim of part 4 bumps against dowel 17, the fluid-passage gap increases until the valve is half-open. The kinetic energy continues to be dissipated inside cavity 12 as the fluid under pressure collides with the fluid not under pressure, thereby causing the fluid surface to rise still further above the spout lip until it reaches the top, i.e., the inside circular section beneath element 15, under which conditions a moderate upward pressure may be applied to the plunger, without however exceeding the plunger's own weight. Under such conditions, only the friction of the top sealing ring acts on the plunger, which is thus in a state of balance. As the inside cross-section of the spout is of large size relative to the flow of fluid, the outflow rate is low, and the fluid flows evenly and free of turbulence.

As the plunger is still further raised until the top of the recess 11 in part 4 bumps into dowel 17, the bottom of the plunger comes to face the wall of the third step of part 5, and an even wider gap is opened for the fluid under pressure to pass. The kinetic energy continues to be dissipated as the fluid under pressure collides with the fluid not under pressure, this process being assisted by the inversion of the fluid direction inside the hollow component from downward to upward. The force originating from the direct upward pressure exerted upon the plunger through the inside circular section beneath element 15 reaches its peak, without however exceeding the amount of friction exerted by the top sealing ring; consequently, the plunger remains in a state of balance and the fluid flows through the valve in an even way.

Consequently, the plunger of the valve according to this invention remains in a state of balance throughout its entire permissible travel with respect to such forces of pressure, friction and weight as come into play, irrespective of the position of the plunger. The plunger may be shifted from its position of rest to any other preselected position in a guided way and always under the direct control of the operator.

Some of the most significant advantages provided by valves according to the present invention will now be mentioned. One definite advantage is the total and effective seal that is constantly preserved, as very little or no wear affects the sealing rings that rub lightly on a very smooth surface, and especially because the sealing rings can in no way be distorted or damaged by excessive force exerted by the operator. The unlimited service life of the valve is furthermore insured by the absence of mechanical parts coupled under stress and reciprocally moving.

Another advantage is provided by the relatively simple manufacturing operations required by the valve resulting from its inherently simple design, which requires none of the structures or coupling means associated with conventional valves. In fact, all components for the valve may be obtained from pipes or round sections using an automatic lathe, or resorting to the even simpler solution of employing plastics. For example, nearly all the valve components may be readily made from granulated plastics, which may be of different colors, each component being individually molded or several components being associated in a single molding, the latter approach being allowed because of the inherently simple design of the valve. If ad hoc molds are used and appropriate molding machines are employed, the basis can be laid of a profitable market for a valve whose service life would be practically unlimited and whose price would be highly competitive.

A further advantage offered by this invention is the wide selection of construction materials that may be used, ranging from appropriate metals or metal alloys, and particularly stainless steel for deluxe production, to man-made plastics for low cost production. As to the sealing rings, any appropriate commercial grade synthetic rubber may be used.

Still another advantage associated with this invention is the smooth turbulence-free outflow at all flow rates with no need for ancillary equipment, as a consequence of the particular flow-controlling features of the valve.

It will be understood that the valves hereinabove described in four embodiments are merely by way of example, it being understood that the invention is not limited to these particular examples, and that numerous other variants may be readily devised by those skilled in the art without departing from the scope of the invention.

It should likewise be noted that valves constructed and arranged according to this invention are suitable for any application whatsoever, and may be used in lieu of conventional valves or gate valves, although their greatest advantage may be expected to be derived from their usage as sanitary fittings for buildings.

What is claimed is:

1. A valve for controlling and shutting off the flow of fluid from a pipe, in which the shutting and control elements are two separate components, one of said components being tubular in shape and positioned inside the other hollow component, the said hollow component being the body of the valve carried by a pipe inserted into the fluid-supply pipe, and the said tubular component being the plunger of the valve, elastic sealing rings being disposed in recesses provided in the cylindrical surfaces of coaxially permanently fitted sleeves disposed inside the valve body, the said sealing rings rubbing and pressing lightly against the smooth cylindrical surface of the plunger facing them, small closed circular areas being the contact regions of the elastic sealing rings on the smooth cylindrical surface within the confines of which the fluid inlet in the valve body is constantly disposed, the cylindrical surface of the top sleeve serving to guide the plunger, the cylindrical surface portion of the bottom sleeve located above the elastic sealing ring having a number of adjacent stepped portions whose diameters are only slightly different from that of the opposite smooth cylindrical surface serving as a fluid control, a cavity being part of the valve body and located beneath the bottom sealing ring serving as a chamber for the dissipation of such kinetic energy as is generated by the fast-flowing fluid colliding with the slow-flowing fluid where the fluid discharge is located, the said fluid discharge means being tubular in shape and aligned with the valve body, and being fitted into a bore provided in the bottom wall of the cavity, and serving to remove turbulence from the outflowing stream of fluid, the said plunger of the valve being slidable through the said sealing rings along their common longitudinal axis, and being furthermore rotatable around the said longitudinal axis, the fluid flow being gradually controllable from fully shut to fully open as a function of the longitudinal position of the plunger relative to the valve body, the plunger being in a state of static balance with respect to any existing pressure and friction as well as with respect to its own weight, whatever its position within the limits of its predetermined traverse, the said plunger being displaceable from its position of rest under guided conditions and solely under the direct control of an operator.

2. A valve for controlling and shutting off the flow of fluid from a pipe, in which the shutting and control elements are two separate components, one of said components being tubular in shape and positioned inside the other hollow component, the said tubular component being the body of the valve and is connected to the fluid-supply pipe being equipped with bores through which it communicates with the inside of the hollow component which is the plunger of the valve, elastic sealing rings being disposed in recesses provided in the cylindrical surfaces of coaxially permanently fitted sleeves disposed inside the plunger, the said sealing rings rubbing and pressing lightly against the outer smooth cylindrical surface of the valve body facing them, small closed circular areas being the contact regions of the elastic sealing rings on the smooth cylindrical surface within the confines of which the fluid inlet in the plunger is constantly disposed, the cylindrical surface of the top sleeve serving to guide the plunger, the cylindrical surface portion of the bottom sleeve located above the elastic sealing ring having a number of adjacent stepped portions whose diameters are only slightly different from that of the opposite smooth cylindrical surface serving as a fluid flow control, a cavity being part of the plunger and located beneath the bottom sealing ring serving as a chamber for the dissipation of such kinetic energy as is generated by the fast-flowing fluid colliding with the slow-flowing fluid where the fluid discharge is located, the said fluid discharge means being tubular in shape and aligned with the plunger, and being fitted into a bore provided in the bottom wall of the cavity, and serving to remove turbulence from the outflowing stream of fluid, the said plunger of the valve being slidable by the said sealing rings on the valve body opposite surface along their common longitudinal axis and being furthermore rotatable around the said longitudinal axis, the fluid flow being gradually controllable from fully shut to fully open as a function of the longitudinal position of the plunger relative to the valve body, the plunger being in a state of static balance with respect to any existing pressure and friction as well as with respect to its own weight, whatever its position within the limits of its predetermined traverse, the said plunger being displaceable from its position of rest under guided conditions and solely under the direct control of an operator.

* * * * *